UNITED STATES PATENT OFFICE.

THEODORE J. WRAMPELMEIER, OF BERKELEY, CALIFORNIA.

CATALYTIC AND PROCESS OF MAKING SAME.

948,947.  Specification of Letters Patent.  Patented Feb. 8, 1910.

No Drawing.  Application filed June 19, 1908. Serial No. 439,425.

*To all whom it may concern:*

Be it known that I, THEODORE J. WRAMPELMEIER, citizen of the United States, residing at Berkeley, in the county of Alameda and State of California, have invented certain new and useful Improvements in Catalytics and Processes of Making Same, of which the following is a specification.

In the manufacture of sulfuric anhydrid by the contact process, ferric oxid is sometimes used as the contact or catalytic agent. The ferric oxid thus used is usually in the form of cinder resulting from the roasting of iron pyrites. Pyrites may be roasted in the form of "lumps" or in the form of "fines." When the cinder is to be used as catalytic material the pyrites is roasted in "lump burners", for the reason that it is necessary to have the cinder in lumps so that, when placed in the contact oven or converter, the gases can pass through the mass easily. The cinder resulting from the roasting of "pyrites fines" is too finely divided to be used in its natural condition, in the stationary contact oven, as it would offer too great resistance to the passage of the gases and would give off too much dust. "Lump pyrites" must be roasted in hand furnaces which requires much labor, whereas "fines pyrites" can be roasted in mechanical furnaces, and at very much less cost for labor and plant. Furthermore, in some localities, "lump pyrites" cannot be obtained as cheaply as "fines pyrites"; in others not at all.

The object of my invention is to enable finely divided ferric oxid, more especially of the cinder resulting from roasting of "fines pyrites" to be successfully used as a catalytic material for the manufacture of sulfuric anhydrid by the contact process. I accomplish this object by mixing the finely divided iron oxid or pulverulent pyrites cinder with a binding or agglomerating agent which will not interfere with its catalytic action and thus forming it into lumps of a suitable size for the contact oven.

In the production of my binding agent I employ sulfuric acid which has the property of agglomerating the finely divided ferric oxid or pulverulent pyrites cinder into firm lumps and forming therewith a product which, after being heated with the ferric oxid or cinder is capable of itself exercising catalytic action.

The finely divided oxid of iron, or pulverulent pyrites cinder is mixed with sufficient sulfuric acid, preferably somewhat diluted, to form a plastic mass. This mass is heated until the water and any excess of sulfuric acid are driven off and it is thus converted into hard porous crusts which are then broken up into lumps of suitable size. I have found it most satisfactory to spread the mass on a hot surface and, when it is thoroughly caked, to increase the temperature to a dull red heat.

It is to be understood that when the agglomerated cinder is subjected to the high temperature of the contact oven the ferric sulfate formed by the action of the sulfuric acid on the cinder is decomposed forming ferric oxid which not only effectively binds the pulverulent cinder together but at the same time itself acts as a catalytic agent.

Heretofore, it has been proposed to agglomerate fine pyrites cinder into lumps by means of a clay binder, but this is unsatisfactory by reason of coating the catalytic agent with an inert material and diluting the cinder with a valueless and troublesome material. The addition of clay not only decreases the value of the cinder as a catalytic, but also increases the difficulty of subsequently treating the cinder, as for extraction of metal contained therein and in some cases renders it unfit for such subsequent treatment. By employing an agglomerating agent, which will form firm and compact lumps and which, after heating produces, in said lumps, a binding material which itself exercises a catalytic action, the above mentioned disadvantages are avoided and a catalytic agent, in lump form, produced from finely divided pyrites cinder which is highly efficient in its action, and which can be handled and used without injurious disintegration.

While I am aware that I am not the first to form pulverulent pyrites cinder into lumps, I am so far as I am aware, the first to form any finely divided catalytic material into lumps by means of a binding agent capable of forming with the finely divided mass, a material capable of exercising catalytic action and such last named process, I contemplate as my invention, as well as a catalytic agent in lump form composed of finely divided catalytic material held together by a binding agent which is itself capable of exercising catalytic action.

I have found that some measure of success may be attained by the employment of solutions of the various metallic sulfates, as for example ferrous sulfate, but as the binding action of these compounds is slight, their use cannot be recommended unless the pulverulent pyrites cinder and the metallic sulfate solution are molded or pressed into shape which is unnecessary when sulfuric acid is employed.

Having described my invention, I claim:

1. The process of making a catalytic from finely divided catalytic material which consists in binding said material together by means of an agglomerating agent adapted to combine therewith and form a catalytic material.

2. The process of making a catalytic from finely divided catalytic material which consists in binding said material together by means of an agglomerating agent, adapted to combine therewith and form a catalytic material upon the application of heat, and heating said finely divided material and agglomerating agent.

3. The process of making a catalytic which consists in binding finely divided pyrites cinder together by means of an agglomerating agent adapted to combine therewith and form a catalytic material upon the application of heat thereto, and heating said cinder and agglomerating agent.

4. The process of making a catalytic which consists in agglomerating finely divided pyrites cinder by means of sulfuric acid and heating the resulting agglomerated mass.

5. A catalytic consisting of finely divided pyrites cinder held or bound together by a binding agent capable of exercising catalytic action.

In testimony whereof I affix my signature in presence of two witnesses.

THEODORE J. WRAMPELMEIER.

Witnesses:
C. L. PARKER,
SIGMUND J. BLOCK.